Jan. 9, 1968 H. FLEISSNER 3,362,079
DRIER AND PROCESS OF DRYING
Filed April 9, 1965 2 Sheets-Sheet 2

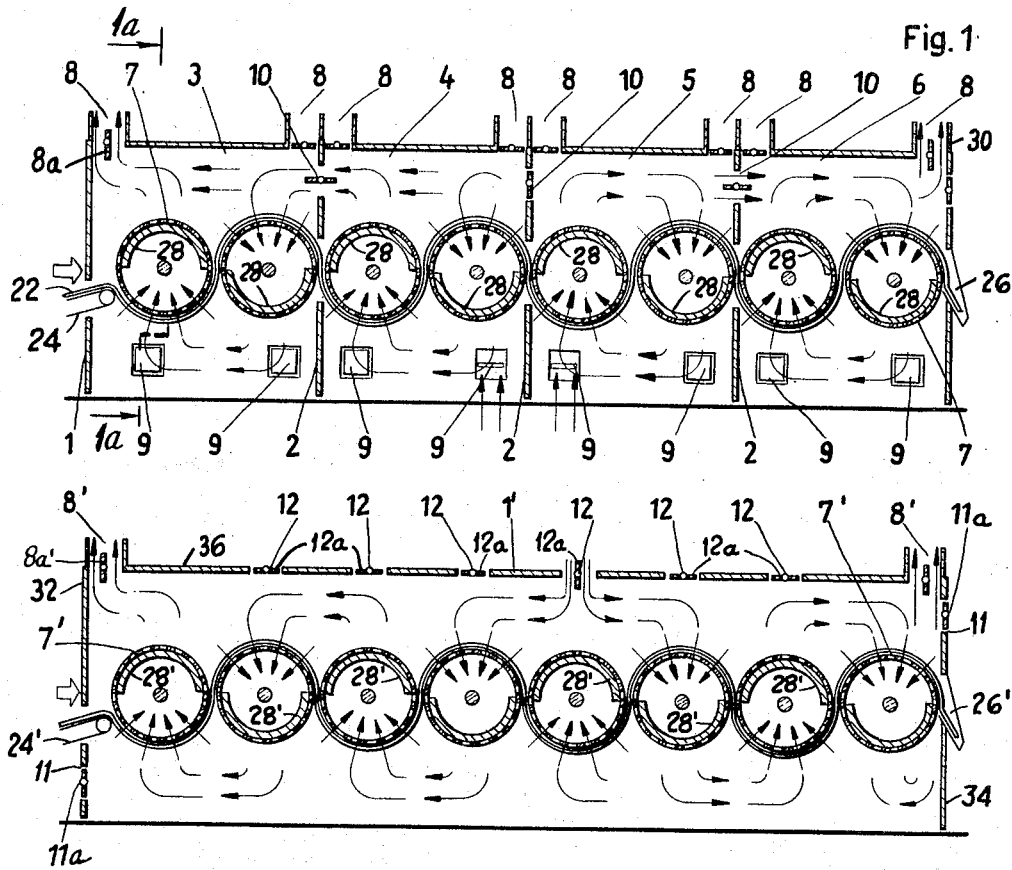

Inventor:
HEINZ FLEISSNER

United States Patent Office 3,362,079
Patented Jan. 9, 1968

3,362,079
DRIER AND PROCESS OF DRYING
Heinz Fleissner, Egelsbach, near Frankfurt, Germany, assignor to Anstalt fur Patentdienst, Vaduz, Liechtenstein
Filed Apr. 9, 1965, Ser. No. 446,849
Claims priority, application Switzerland, Apr. 22, 1964, 5,242/64
11 Claims. (Cl. 34—23)

This invention relates in general to an apparatus and a method for treating textile materials, and particularly to a new and useful method and device for drying materials of all kinds, but preferably air-permeable materials using heating fluids which are directed both in counter-current and co-current directions.

The invention relates to a process and a device for drying all kinds of material, preferably material which is permeable to air, such as textiles, by means of e.g. sieve drum dryers, in which a drying medium is passed over or through the material to be dried by the co-current principle and/or the counter-current principle.

The drying medium—in general heated air—can, in the case of moving material, be guided in the direction of motion of the material either in accordance with the co-current principle or the counter-current principle. However, it is also possible to guide the drying medium transversely to the direction of motion of the material. Depending on the flowing direction of the drying medium in respect of the material to be dried one speaks of the co-current, the counter-current or the cross-flow principle and/or process.

With the counter-current principle, the damp material, when entering the dryer, comes into contact with air which is already cooled down and enriched with moisture. The hot fresh air, however, runs against the predried material. With temperature-sensitive materials, the counter-current principle must be applied with care. The main advantages of the counter-current principle are the economy and the fact that the material can be dried down to an essentially lower final moisture content than with the co-current principle. On the other hand, this involves a danger, because with the counter-current principle it is also possible to overdry the material. If overdrying is to be avoided, the co-current principle will be applied for drying.

With the co-current principle, the hot fresh air encounters the damp, relatively cool material at the inlet. The large difference in temperature prevailing at this point results in a considerable exchange of heat and considerable moisture removal. However, the high moisture content of the material prevents overheating of the material, i.e. the material cannot assume excessive temperatures. With the co-current principle, the moisture absorption of the fresh air is highest when the material enters the dryer. The fresh air is then gradually enriched with moisture so that it can absorb less and less moisture from the material; therefore, overdrying of the material is impossible. Disadvantages of the co-current principle are that the material can only be dried to a certain degree and that operation is less economical than with the counter-current principle. The moisture content of the air discharged from the dryer is by far less economical than with the counter-current principle because with the co-current principle the moisture content of the air discharged from the dryer is lower than with the counter-current principle, and therefore a considerably larger amount of air is required for discharging the same amount of moisture. And since with each pound of air a corresponding amount of heat is discharged, the loss of energy is considerable.

With the cross-flow principle, the drying medium or the fresh air flows vertical to the direction of motion of the material. In this case, the damp material which is to pass the dryer as well as the dry material must be insensitive to high temperatures and must withstand a great exchange of heat and considerable moisture removal. With the cross-flow principle the air conditions cannot be adapted to the drying process, except when sieve drum dryers are used. The main advantages of this principle are short drying times.

Cross-flow principle and co-current principle or counter-current principle are combined in the case of sieve drum dryers with several sieve drums arranged in series over which the material to be dried is passed and in the interior of which a suction draft is created by means of one or several fans, by which suction draft the material to be dried is sucked against the drum jacket. In such drying devices the drying air flows spirally, either in co-current or in counter-current, through the device and penetrates the material to be dried several times according to the cross-flow principle.

With sieve drum dryers with several drums the advantages of the cross-flow principle are, therefore, combined with the advantages of the co-current principle or the counter-current principle, the disadvantages of the cross-flow principle being largely eliminated at the same time.

In order to simplify matters and in connection with the sieve drum dryer, in the following the combination of the cross-flow principle and the co-current principle will be called co-current principle and the combination of the cross-flow principle and the counter-current principle will be termed counter-current principle.

Dryers are known which work by the co-current principle and also sieve drum dryers with several sieve drums which work by the counter-current principle. Since, as is well known, the individual materials have quite different drying properties and, in particular, react very differently to overdrying, up to now, when designing a sieve drum dryer, it had to be decided from case to case whether the dryer was to work by the co-current principle or by the counter-current principle. Such dryers are of disadvantage because they are only suitable or economical for a certain type of drying material.

If these sieve drum dryers are used for any type of drying material, the disadvantage must be accepted that either they work less economical than is necessary for the drying material involved or that owing to overdrying the quality of the drying material is possibly affected.

The object of this invention is to eliminate the afore-described disadvantages as far as possible.

In order to dry a material in the shortest possible time, it is, for example, advantageous to pass the material first through a co-current drying stage, then through a counter-current drying stage and finally again through a co-current drying stage. It is even more advantageous to have the material to be dried passed through several drying stages part of which work by the counter-current principle and part of which work by the co-current principle, whereby the individual drying stages working by the counter-current principle and those working by the co-current principle can be coordinated in such a way that at no point the temperature conditions in the dryer permit drying of the material beyond the desired final moisture content. The individual drying stages can be switched to counter-current principle or co-current principle manually or automatically. In case of automatic setting, the means for controlling the drying stages can be determined by the temperature conditions prevailing in the drying stage in question in relation to the desired moisture content of the material to be dried in that stage.

For the realization of the afore-described processes according to the invention, a device is suggested which is composed of various units, preferably structural units, with sieve drums in the interior of which a suction draft created by one or several fans exists, by which suction draft the drying material is sucked to the drum jacket. In accordance with the invention each unit can be changeably (switchably) operated by the co-current principle and by the counter-current principle. For this purpose each unit is provided with at least one air inlet and air outlet flap or opening which can be adjusted and closed for the co-current process and at least one air inlet and air outlet flap or opening which can be adjusted and closed for the counter-current process.

Owing to this measure, the device according to the invention is capable of working exclusively by the co-current principle as well as exclusively by the counter-current principle; also it is possible to choose any desired combination of these two principles. Moreover, it is possible to equally use the dryer or the device for very delicate as well as for completely insensitive drying materials and to reach optimum economy and drying quality for the respective material.

Optimum economy of such dryers is achieved because the air discharged from one unit can be led into the next unit, provided that both units work by the same principle. If more than two units work by the same principle, the drying air for all units working by the same principle can be the same. Therefore, fresh air need only be supplied once to the units working by the co-current principle and once to the units working by the counter-current principle.

A modification of the afore-described device according to the invention is provided with a common drying chamber for the combined co-current and counter-current principle and several air inlet openings of which preferably only one is open at the time so that the required fresh air is supplied to the chamber through one common opening. Air outlet openings are provided near the two end walls.

Further advantageous and expedient features of the invention applied for may be gathered from the following embodiments as described and/or shown; these individual features, like those already mentioned, are in common (in combination) also essential to the invention.

Accordingly, it is an object of this invention to provide a process for drying materials of all kinds, but preferable air-permeable materials such as textiles, by directing a drying medium, for example air, over or through the material to be dried as the material is passed successively through several drying stages in which at least at one of the drying stages the air is directed in a co-current direction in respect to the material flow and in at least one other stage the air is directed in a counter-current direction in respect to the material flow.

A further object of the invention is to provide a device for drying preferably air-permeable materials which includes a plurality of drying drums having perforated surfaces over which the material is directed and wherein each drum includes means for producing an interior vacuum or inward flow through the perforations of the drum at selected areas for causing the material to adhere to the drum and be transported from one drum to the next in a row, and wherein the drums are arranged in a chamber providing for the flow of a drying fluid such as air at least partially in a direction which is counter to the direction of movement of the material from one drum to the next, and further at least partially in a stage or location at which part of the drying fluid is moved in the same direction as the movement of the material.

A further object of the invention is to provide a process of drying textile materials using a drying fluid such as air wherein the counter-current and co-current flow of the drying air is employed at various stages of the drying in accordance with the particular materials being treated and in accordance with the temperature and moisture conditions of the material being dried in order to facilitate increased drying action and the most desirable handling and treatment of the materials.

A further object of the invention is to provide an apparatus for drying textile materials which is simple in design, rugged in construction and economical to manufacture.

The various features of novelty which characterize the invention are pointed out with particularity in the claims annexed to an forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a transverse sectional view of a multi-drum drier constructed in accordance with the invention;

FIG. 2 is a view similar to FIG. 1 of another embodiment of the invention; and

FIG. 3 is a view similar to FIG. 1 of still another embodiment of the invention.

Figure 1A:
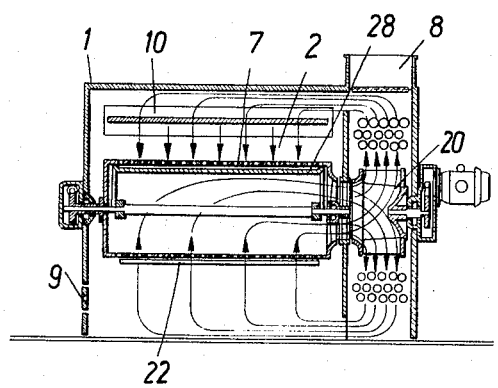
FIG. 1a is a section taken on the line 1a—1a of FIG. 1.

With the multi-drum dryer according to FIG. 1, the housing 1 is divided into four chambers 3, 4, 5 and 6 by partition walls 2. Each of these drying chambers 3 to 6 can also be designed as independent constructional units. It is only by way of an example that the multi-drum dryer is shown with four chambers; it may also have more or fewer chambers.

In each chamber, e.g. two cylinders with perforated surfaces or sieve drums 7 are arranged which carry and guide the material 22 to be dried through the dryer. To at least one side of each drum a fan 20 (FIG. 1a) is mounted which sucks the air out of the drum so that a partial vacuum exists in the drum which vacuum makes the drying material 22 adhere to the drum jacket. The air is led through the drying material into the drum. Each chamber may accommodate any desired number of drums; the number of sieve drums 7 in the individual chambers 3 to 6 may differ. The material 22 is let into the housing 1 on a belt conveyor 24 and is mounted over the drums 7 in succession to a discharge chute 26 at the opposite end.

Since each chamber 3 to 6 of the multi-drum dryer shown in FIG. 1 may be designed as independent constructional units so that any number of drying chambers can be provided, each chamber 3 to 6 is provided with two outlet openings 8 and two inlet openings 9. Furthermore, each partition wall 2 which connects or divides the individual chambers 3 to 6 is provided with at least one opening 10 which can be closed by a slide plate or a flap, so that part of the circulated air can flow over into the adjacent chambers, provided that they work by the same principle.

In the embodiment illustrated in FIG. 1, it can be seen that the chambers 3, 4, 5 and 6 may be arranged for any type of flow of the drying fluid which may be a gas such as air. In the illustrated embodiment, in the first chamber 3 which is directly adjacent the inlet conveyor 24, air is admitted primarily through an opening 10 defined between the chambers 3 and 4 and thus flows in a counter-current direction first through the material carried by the second of the drums 7 in the series and is discharged at an end of the drum and then delivered over the material carried by the first drum of the series which is located directly adjacent the inlet. The heating air is eventually discharged through the discharge opening 8. Such flow, therefore, is in a counter-flow direction with the hottest air being delivered to the material which has been advanced the furthest, and thereafter the air which is cooled somewhat is circulated over the material which is the wettest adjacent the inlet of the housing. Thus it can be seen that the pivotal control elements 8a which are arranged in the outlet openings 8 and the control elements 9a which are arranged in the inlet openings 9 may be regulated to achieve the desired counter-current flow and co-current flow of the drying fluid.

Each of the drums 7 carries internal adjustable baffle plate members 28 which are positioned to cut off the openings on selected portions of the periphery of the drum so that the material will be guided from one drum to the next in a desired manner.

The chambers 3 and 4 of the device shown in FIG. 1 work by the counter-current principle whereas the chambers 5 and 6 work by the co-current principle. For that reason, the right-hand inlet opening 9 of chamber 4 and the left-hand outlet opening 8 of chamber 3 are open. The residual three inlet openings 9 and the three outlet openings 8 of the chambers 3 and 4 are closed. Opening 10 in partition wall 2 which separates the chambers 3 and 4 is also open. With the chambers 5 and 6 working by the co-current principle the left-hand inlet opening 9 of chamber 5 and the right-hand outlet opening 8 of chamber 6 are open. The residual inlet and outlet openings are closed. Furthermore, opening 10 in the partition wall 2 which separates the two chambers 5 and 6 is open whereas opening 10 in the partition wall 2 between the two chambers 4 and 5 is closed.

In principle, it is also possible to design the sieve drum dryer in such a way that the air discharged from the chamber 6 is supplied to the inlet opening 9 of e.g. chamber 4 by a pipe connection 30 which advantageously is connected to one or more inlets 9. Thus the device works most economically. With the design of the chambers shown it is, of course, also possible to choose any other combination; for example only chamber 3 might work by the counter-current principle whereas the chambers 4 to 6 work by the co-current principle or the chambers 3 to 5 are operated by the counter-current principle and only chamber 6 is operated by the co-current principle.

FIG. 2 shows a modified and constructionally simpler embodiment of the invention. The device shown in FIG. 2 has only one drying chamber. The end walls 32 and 34 of the housing 1' are provided with inlet openings 11 which can be closed by dampers or flaps 11a. The openings 11 are for the fresh air and some inlet and outlet openings 8' and 12 (which can also be closed by associated dampers or flaps 8a' and 12a) are provided in the top wall or ceiling 36. These inlet and outlet openings 8', 11, and 12 may be also be provided in the side walls instead of in the ceiling of the device. The device shown in FIG. 2 is much simpler in construction than the device shown in FIG. 1. The device shown in FIG. 2 can either be exclusively operated by the co-current principle or exclusively by the counter-current principle or by a combination of these two principles whereby a counter-current zone can be followed by a co-current zone or a co-current zone by a counter-current zone, etc. The relation between co-current zone and counter-current zone can be varied according to which flap 12a is open.

It is a matter of course that also with the device shown in FIG. 2 any number of drums may be provided and the corresponding number of inlet openings 12. Furthermore, it is a matter of course that the sieve drums can be arranged in line as shown in the devices shown in FIGS. 1 and 2 or in staggered arrangement (at different levels).

A device with sieve drums in staggered arrangement is shown in FIG. 3; this device operates by the co-current principle. However, it may also work by the counter-current principle or by a combined counter-current/co-current principle or co-current/counter-current principle. The corresponding parts are designated in a manner similar to those of FIGS. 1 and 2 but with additional prime indications.

In all three figures the arrows outside the device indicate the direction of material passage through the devices whereas the arrows inside the devices show the air flow conditions.

In many cases all requirements will be met by a device in which the individual chambers cannot independently by operated by the two principles but in which one or several chambers work by the counter-current principle and one or several chambers work by the co-current principle. Also here the material is treated by the two principles. However, the combined principle is set once for all and cannot be varied without constructional changes.

While specific embodiments of the invention have been shown and described in detail to illustrate the application of the inventive principles, it will be understood that the invention may be embodied otherwise without departing from such principles.

What is claimed is:

1. A device for drying textile materials which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums.

2. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharged means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, said flow control means including a plurality of partition walls dividing said housing between at least two of said drums and a control flap in said partition wall for selectively opening and closing the communication between the portions of said housing divided by said partition wall for the circulation of the drying fluid therethrough in a desired flow pattern.

3. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, said flow control means including inlet and outlet openings in said housing for the inflow and outflow of the heating fluid arranged at a plurality of locations along the length thereof in respect to the direction of advance of the material being dried in said housing, and a control flap associated with each of said inlet and outlet openings for regulating the inflow and outflow of drying fluid therethrough in a plurality of desired flow patterns.

4. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, said flow control means including a plurality of partition walls dividing said housing between at least some of the adjacent drums and a control flap in said partition wall for selectively opening and closing the communication between the portions of said housing divided by said partition wall for the circulation of the drying fluid therethrough, inlet and outlet openings in said housing for the inflow and outflow of the heating fluid arranged at a plurality of locations along the length thereof in respect to the direction of advance of the material being dried in said housing, and a control flap associated with each of said inlet and outlet openings for regulating the inflow and outflow of heating fluid therethrough.

5. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, at least one partition wall in said housing dividing said housing into at least two separate treatment chambers, a plurality of said drums being located in each of said chambers, said partition wall permitting the passage of the material being treated from the last drum in a row of the drums in one of said treatment chambers to the first drum in the next treatment chamber, at least one inlet opening for heating fluid directed into one of said treatment chambers, at least one outlet opening connected into the other of said treatment chambers, and means between said chambers for permitting flow therebetween of the drying fluid.

6. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, at least one partition wall in said housing dividing said housing into at least two separate treatment chambers, a plurality of said drums being located in each of said chambers, said partition wall permitting the passage of the material being treated from the last drum in a row of the drums in one of said treatment chambers to the first drum in the next treatment chamber, an inlet opening adjacent each end of each of said treatment chambers for the inlet flow and outlet flow of a heating fluid thereinto, and at least one opening in said partition wall for permitting flow from one of said treatment chambers to the other.

7. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated ot the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, at least three spaced partition walls dividing said housing interiorly for separate treatment chambers, each said partition wall having an opening for permitting the passage of material being treated from the drums in one chamber to the adjacent drums in the next chamber, and each partition including a separate opening for the passage of heating fluid from one chamber to the next, a control flap in each partition wall for regulating the flow of heating fluid between chambers, first and second inlet openings connected into each of said chambers for the inflow of heating fluid, first and second outlet openings connected into each of said chambers for the discharge of heating fluid, and control means for each of said inlet and outlet openings for regulating the flow of drying fluid into said inlet openings and out said outlet openings, said control means for said inlet and outlet openings and said flaps in said partition walls being set to provide for the counter-flow of drying fluid in respect to the movement of the material being treated in the first and second chambers in succession and to provide the co-current flow of drying fluid in respect to the material being treated in the third and fourth chambers in succession.

8. A device for drying textile materials and the like which are air-permeable, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a fluid through the perforations, and any material on the surface of the drum overlying the perforations, into the interior of the drum and for discharging the fluid to one side of said drum, fixed baffle means inside each of said drums closing off the perforations over a portion of the interior periphery of the drum, adjacent drums in a row having said baffle means located in a complementary opposite manner so that the materials to be treated which are carried on the surface of the drum will be lifted from one drum to the next by the action of said baffle means to discontinue the inflow of air through the perforations of one drum as the material approaches the next drum having said baffle means located to cause adherence and transfer of the material at such location, inlet means in said housing for directing the material to be treated to the first drum in a series for subsequent transfer over a portion of the surface of each drum in a row, discharge means in said housing for receiving the material from the last drum and directing it out of the housing, and flow control means within said housing for directing a drying fluid in the vicinity of each drum adjacent the portion thereof which is effective for holding the material to be treated thereon by the inflow of drying fluid through the perforations into the interior of the drum, said flow control means permitting flow of the drying fluid to and into each drum and from one adjacent drum to the next, said flow control means providing at least some flow of drying fluid from one drum to the next adjacent drum in a sequence contrary to the sequence of the movement direction of the material in respect to the affected drums and also providing some flow of the drying fluid from one adjacent drum to the next in the same sequence as the movement of the material over the affected drums, at least three spaced partition walls dividing said housing interiorly for separate treatment chambers, each said partition wall having an opening for permitting the passage of material being treated from the drums in one chamber to the adjacent drums in the next chamber, and each partition including a separate opening for the passage of heating fluid from one chamber to the next, a control flap in each partition wall for regulating the flow of heating fluid between chambers, first and second inlet openings connected into each of said chambers for the inflow of heating fluid, first and second outlet openings connected into each of said chambers for the discharge of heating fluid, and control means for each of said inlet and outlet openings for regulating the flow of drying fluid into said inlet openings and out said outlet openings, said control means for said inlet and outlet openings and said flaps in said partition walls being set to provide for the counter-flow of drying fluid in respect to the movement of the material being treated in the first and second chambers in succession and to provide the co-current flow of drying fluid in respect to the material being treated in the third and fourth chambers in succession, and means connected to said outlet of one of said chambers for circulating the drying fluid back to said inlet of at least one preceding stage.

9. A process for drying air permeable textile materials by means of a plurality of perforated drum driers which are arranged in side by side substantially abutting relationship and in which the drying medium, for example air, is induced through the material to be dried and through perforations on the circumferential periphery of said drums by a fan arranged at the end of the drums, the drums being arranged to extend across a drying chamber between an inlet adjacent one end into which the textile materials are directed and outlet adjacent the opposite end through which the dried textile materials are passed, comprising advancing the material through a housing for treatment in a plurality of drying stages first over a partial area of the circumferential periphery of the first drum adjacent the inlet and then over a partial circumferential area of the next adjacent drum and so on to the next adjacent drums to the outlet while drying air is pulled through the material and through the perforations of the drum by the drum fans arranged at the end of the drums, and directing air through the chamber surrounding the drums to provide a plurality of drying stages wherein at least one of the drying stages is carried out by co-current flow of material and drying air as the material is advanced over the drums and another of the stages is carried out by counter-current flow of material and drying air as the material is advanced over the drums from the inlet to the outlet.

10. A process, according to claim 9, wherein first stage is a stage in which the drying fluid and the material are moved in heat transfer relationship in a co-current manner, at least one of the intermediate stages being a counter-current drying stage and the final stage being a con-current drying stage.

11. A process, according to claim 9, wherein each of said drying stages are coordinated to provide for counter-current drying stages and co-current drying stages as the material is being fed to insure that at no point the drying conditions in the dryer permit overdrying in the material beyond the desired final moisture content.

References Cited

UNITED STATES PATENTS

| | | | |
|---|---|---|---|
| 1,601,332 | 9/1926 | Whitehead et al. | 34—115 |
| 2,416,027 | 2/1947 | Shields | 34—115 |
| 2,758,356 | 8/1956 | Kawaguchi | 34—159 X |
| 2,922,229 | 1/1960 | Kiefer | 34—115 |
| 3,263,336 | 8/1966 | Sjogren | 34—23 |

KENNETH W. SPRAGUE, *Primary Examiner.*